No. 789,487. PATENTED MAY 9, 1905.
W. E. CARPENTER.
CONTROL OF ELECTRIC MOTORS.
APPLICATION FILED OCT. 10, 1904.
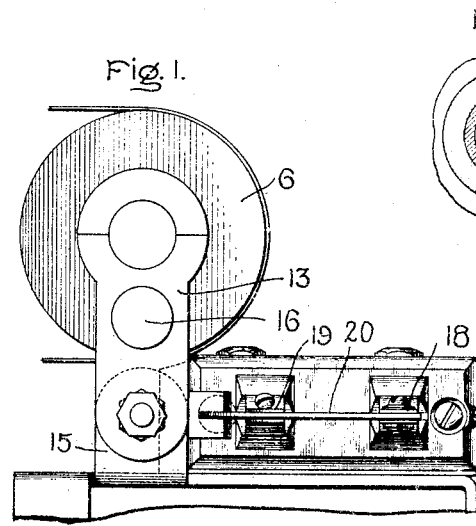
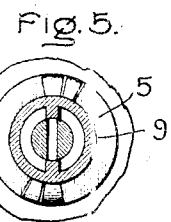
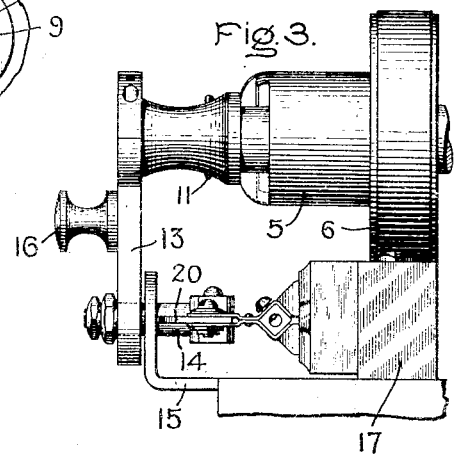
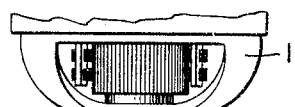
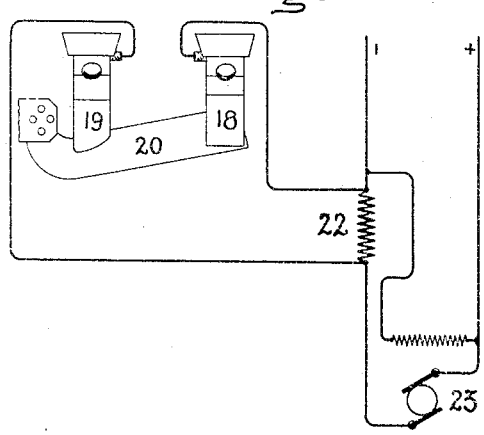
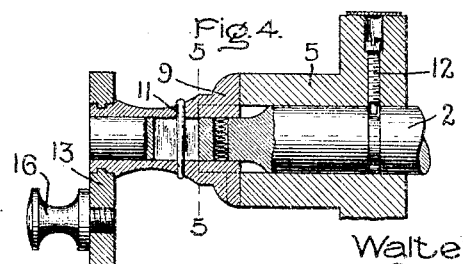
Witnesses:
Inventor,
Walter E. Carpenter,
By Albert H. Davis,
Atty.

No. 789,487.              Patented May 9, 1905.

UNITED STATES PATENT OFFICE.

WALTER E. CARPENTER, OF LYNN, MASSACHUSETTS, ASSIGNOR TO GENERAL ELECTRIC COMPANY, A CORPORATION OF NEW YORK.

CONTROL OF ELECTRIC MOTORS.

SPECIFICATION forming part of Letters Patent No. 789,487, dated May 9, 1905.

Application filed October 10, 1904. Serial No. 227,829.

*To all whom it may concern:*

Be it known that I, WALTER E. CARPENTER, a citizen of the United States, residing at Lynn, in the county of Essex and State of Massachusetts, have invented certain new and useful Improvements in Control of Electric Motors, of which the following is a specification.

This invention relates to a system of control of a shunt-wound electric motor; and its object is to provide means for running such a motor at constant speed.

A shunt-motor is commonly termed a "constant-speed" motor; but it is well known that varying the load on the motor causes a slight variation in the speed of rotation. In some cases it is essential that a shunt-motor driving a machine should run at constant speed irrespective of the load thereon—as, for instance, in machines having such delicate parts that a variation in speed might injuriously affect them or disturb their proper operation. As an example, a linotype-machine has a distributing mechanism which is exceedingly delicate, and for convenience and simplicity a single shunt-wound electric motor is used to drive it and the other parts of the machine. When the load driven by the motor other than this distributing mechanism is thrown on or off, the speed of the motor, and hence the speed at which this mechanism is driven, would decrease or increase slightly unless some means were provided to prevent it, and this variation in speed, on account of the delicate construction of the mechanism, is apt to cause imperfect operation or even break some of the parts. In order to obtain constant speed irrespective of the load on the motor, I provide a resistance and means by which it is cut into or out of the circuit of the motor-armature as the load on the motor is thrown off or on, and so proportion this resistance that by cutting down the current in the motor-armature it will exactly compensate for the change of speed which would result from coupling the load to or uncoupling it from the motor.

My invention therefore comprises a shunt-wound electric motor, means for varying the load thereon, and means whereby the motor is run at constant speed irrespective of changes in the load thereon. Other more specific features of my invention will be definitely indicated in the claims appended hereto.

The principles of my invention may be embodied in many different constructions, depending on the arrangement of the parts of the machine and the character of the load driven by the motor. In many machines it is common to provide clutches for coupling portions of the load to a shaft driven by the motor. In such a machine the movement of the parts of the clutch may be made to move the arm of a switch for cutting the resistance into or out of circuit, and thus keep the motor speed constant. In the accompanying drawings I have illustrated such a construction; but it must be understood that this is adopted merely for purposes of illustration and that the principles of my invention may be employed in constructions widely different therefrom.

In the drawings, Figure 1 is an end elevation of the clutch and switch. Fig. 2 is a plan view of the same, showing the motor driving the parts. Fig. 3 is a back view of the clutch and switch. Fig. 4 is a section on line 4 4 of Fig. 2. Fig. 5 is a section on line 5 5 of Fig. 4, and Fig. 6 is a diagram of the circuits.

Referring to the drawings, 1 indicates a shunt-wound electric motor driving a shaft 2, on which is keyed a pulley 3. A belt 4, running on this pulley, communicates rotary motion from shaft 2 to another shaft, and thus connects motor 1 to a load. Loose on the shaft 2 is a sleeve 5, having a pulley 6 thereon, and a belt 7 runs on this pulley and a pulley on another shaft, so that when sleeve 5 is coupled to shaft 2 an additional load is thrown on the motor. On sleeve 5 are projections 8, and a clutch member 9, movable axially on shaft 2, is provided with projections 10, adapted to coöperate with the projections 8. The end of shaft 2 on which the clutch member 9 moves is slotted, and a pin 11 is secured to the clutch member and extends through this slot, so that member 9 turns with shaft 2, but is movable axially thereon. A pin 12 in sleeve 5 extends into a groove in shaft 2 to prevent movement of the sleeve axially of shaft 2. In order to move member 9 into and out of clutching relation to sleeve 5, an arm 13 is secured to the end of shaft 2 in a manner permitting rotary motion of the shaft therein and extends downwardly therefrom. At its lower end arm 13 is provided with a stud 14, which extends through an opening in an L-shaped piece 15, secured on a stationary portion of the machine. A stud 16 or other suitable device is fastened to arm 13, by which the arm and the clutch member 9 may be moved axially of shaft 2 to move the projections 10 out of or into engagement with the projections 8.

Mounted on a block 17, secured to the machine, are switch-clips 18 and 19, and a blade 20 is pivoted in the clips 18 and loosely connected to an arm 21, secured to the stud 14. The armature 22 of the motor 1 is connected in circuit through the clips 18 and 19 and blade 20, and a resistance 22 is connected between clips 18 and 19, so that when blade 20 is out of engagement with clips 19 the armature-circuit is completed through the resistance 22, and this resistance is short-circuited when blade 20 enters clips 19.

The operation of the device as thus constructed will be readily understood from the foregoing description. The motor 1 may be used to drive two independent machines or two parts of a single machine by means of belts 4 and 7. The mechanism driven by belt 4 may be of delicate construction, requiring constant speed for perfect operation, and the mechanism driven by belt 7 may be such that it is desired to start and stop it at intervals. As shown in Fig. 2 both mechanisms are coupled to the motor 1. If it is desired to stop the parts driven by belt 7, the clutch member 9 is moved axially of shaft 2 by the stud 16 and arm 13 or by a pivoted lever connected to arm 13, thus moving projections 10 out of engagement with projections 8. This movement, however, carries the switch-blade 20 out of engagement with clips 19, so that the armature-circuit of motor 1 is completed through the resistance 22, which cuts down the armature-current. The resistance 22 is so proportioned that the armature-current is cut down just enough to compensate for the change in the speed of rotation of the motor-armature which would be caused by uncoupling the load carried by belt 7 from the motor if the resistance and switch were not used. To again start the mechanism driven by belt 7, clutch member 9 is moved forward again, projections 10 engage projections 8, and sleeve 5 rotates with shaft 2. In doing this blade 20 is moved into engagement with clips 19, resistance 22 is short-circuited, and the normal current admitted to the armature 23. The speed of motor 1 therefore remains constant under all loads.

As above pointed out, the construction shown and described herein is merely illustrative of the principles of my invention, and I do not wish to be understood as limited to this or any other specific embodiment of my invention. Also it is obvious that several clutches or equivalent devices might be employed for connecting the motor 1 in driving relation to different machines or portions of a machine and each of these clutches arranged to short-circuit a resistance in the armature-circuit.

What I claim as new, and desire to secure by Letters Patent of the United States, is—

1. The combination of a shunt-wound electric motor, means for changing the load driven thereby, and means for compensating for changes in the load to obtain constant speed of the motor.

2. The combination of a shunt-wound electric motor, means for connecting it in driving relation to a load and disconnecting the load therefrom, and means whereby the motor is run at constant speed irrespective of the load thereon.

3. The combination of a shunt-wound electric motor, a clutch for changing the load thereon, and means operated with said clutch to compensate for changes in the load to obtain constant speed of the motor.

4. The combination of a shunt-wound electric motor, means for changing the load driven thereby, and means whereby changing the load, changes the resistance of a circuit of the motor.

5. The combination of a shunt-wound electric motor, means for changing the load thereon, and means whereby reducing the load cuts resistance into the armature-circuit of the motor.

6. The combination of a shunt-wound electric motor, a clutch for connecting the motor in driving relation to the load and disconnecting the load therefrom, a switch operated with said clutch, and a resistance in circuit with the motor controlled by said switch.

7. The combination of a shunt-wound electric motor, a clutch for connecting the motor in driving relation to a load and disconnecting the load therefrom, a resistance in the armature-circuit of the motor, and means whereby operating the clutch to connect the load to the motor short-circuits the resistance.

8. The combination of a shunt-wound electric motor, a clutch for connecting the motor in driving relation to a load and disconnecting the load therefrom, a switch having a movable member connected to the clutch and adapted to close the armature-circuit of the motor, and a resistance in shunt to the switch.

In witness whereof I have hereunto set my hand this 6th day of October, 1904.

WALTER E. CARPENTER.

Witnesses:
JOHN A. McMANUS, Jr.,
GEORGE H. RYPINSKI.